United States Patent
Bowater et al.

(10) Patent No.: US 6,335,964 B1
(45) Date of Patent: Jan. 1, 2002

(54) VOICE PROCESSING SYSTEM

(75) Inventors: Ronald John Bowater; Nicholas David Butler, both of Romsey; David Andrew Clarke, Eastleigh; David Seager Renshaw, Winchester; Graham Hugh Tuttle, Southampton, all of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/069,378

(22) Filed: Apr. 29, 1998

(30) Foreign Application Priority Data

Sep. 19, 1997 (GB) .............................................. 9719942

(51) Int. Cl.⁷ ............................................. H04M 11/00
(52) U.S. Cl. ............................... 379/88.16; 379/88.17; 379/201.03; 709/315
(58) Field of Search .............................. 379/67.1, 88.01, 379/88.04, 88.16, 88.17, 88.22, 88.23, 88.27, 88.28, 201, 210, 214, 201.01, 201.02, 201.03, 201.12, 210.02, 214.01, 219; 709/204, 315; 707/103; 370/352, 356

(56) References Cited

U.S. PATENT DOCUMENTS

| | | | |
|---|---|---|---|
| 5,255,305 A | | 10/1993 | Sattar |
| 5,452,341 A | | 9/1995 | Sattar |
| 5,455,854 A | * | 10/1995 | Dilts et al. ................... 379/201 |
| 5,794,039 A | * | 8/1998 | Guck .......................... 707/13 |
| 5,802,146 A | * | 9/1998 | Dulman ....................... 379/34 |
| 5,933,492 A | * | 8/1999 | Turovski ..................... 379/265 |
| 5,999,525 A | * | 12/1999 | Krishnaswamy et al. ... 370/352 |
| 6,141,724 A | * | 10/2000 | Butler et al. ................. 717/11 |

FOREIGN PATENT DOCUMENTS

| | | |
|---|---|---|
| EP | 0484069 A2 | 5/1992 |
| EP | 0697780 A2 | 2/1996 |
| GB | 2170377 A | 7/1986 |
| JP | 6318977 | 3/1993 |

OTHER PUBLICATIONS

PC Week Apr 14, 1997, p106 'Java Poised to Integrate computers, Telephony' D Kosiur.
'NexPath Specifications' http://www.nexpath.com/specifications.htm.
'NexPath Brings CTI to the Mac (and Unix, and PCs, and web terminals. . . )' http://www.phonezone.com/nexpath/ct–writeup.htm.
'Sun Microsystems Introduces Javatel Platform for Java–Based CTI Applications' http://www.sun.com/smi/Press/su . . . 9703/sunflash.970304.39340.html.
'VPS/VAS—Voice Processing Series (Voice Application Server)' http://www.peri.com/product/vpsvasbr.html.
'NexPath Introduces the NexPath NTS Telephony Server' Computer Telephone, May 1997, p70.
'Java to Take Centre Stage at CT Expo' http://www.techweb.com/wire/news/feb/0228ctexpo.html.body?.

* cited by examiner

Primary Examiner—Fan Tsang
(74) Attorney, Agent, or Firm—Jerry W. Herndon

(57) ABSTRACT

A voice processing system is connected to a switch via multiple telephone lines, and provides a set of line objects, each line object being associated with one of the physical telephone lines. The line object allows a demarcation to be made between the underlying voice processing system software, and external business applications. Thus a line object supports a set of methods such as Get DTMF Tone, Play Audio, Answer Call, and End Call, to allow the external business applications to perform desired operations on a telephone line. These methods are invoked via a set of corresponding IVR action objects, which in turn are integrated into the business application. The business application itself, and its IVR actions, regard the line objects effectively as servers to provide IVR functionality. The business application may therefore run partially or completely on a separate physical machine from the IVR system itself.

15 Claims, 2 Drawing Sheets

VOICE PROCESSING SYSTEM

BACKGROUND OF THE INVENTION

The present invention relates to voice processing systems which connect to multiple telephone lines for call processing applications.

Voice processing systems are very well-known in the art and are used to perform a wide range of functions. For example, a common form of voice processing system is a voice response unit (VRU), which can be installed at a call centre, and can be used to process incoming calls, often as an initial screening process, or when no human agent is currently available. Thus a typical application might be for the call to come through to the VRU, which plays out to the caller a pre-recorded prompt presenting the caller with a set of options. The caller can then select the desired option by pressing a particular dual tone multiple frequency (DTMF) key on their telephone, and the VRU then performs the requested function. One option for example may simply be for the caller to hear more information (eg about ticket availability), whilst another option may result in the caller being transferred to a live agent (eg to make a ticket reservation). The dialogue between the caller and the VRU can be quite complex, for example, the caller may be required to input a range of dates for which information about ticket availability is required.

An example of a voice processing system is the DirectTalk for AIX voice processing system available from IBM Corporation, and described in the manual "DirectTalk for AIX, General Information and Planning", reference number GC33-1840-00, plus the other manuals referenced therein. Like many modern voice processing systems, the DirectTalk system is based on a general-purpose computer (in this case an RS/6000 workstation) with additional hardware and software for the telephony and voice processing functions. (DirectTalk, AIX, and RS/6000 are trademarks of IBM Corporation).

It is possible to develop very sophisticated applications on the DirectTalk voice processing system, using the wide range of supported features which include: speech recognition (normally as a substitute for DTMF input); FAX; voice mail; use of Automatic Number Identification/Dialled Number Identification Service (ANI/DNIS) information that identifies the calling/called number respectively; text to speech conversion; and remote data-base access.

The structure of a conventional voice processing application is shown in FIG. 1, which illustrates an application 200, the DirectTalk software 210, and an operating system 220 all resident on a single workstation. The DirectTalk software 210 is responsible for accepting the state tables and other components of the customer application 200, and executing as appropriate in conjunction with the operating system 220 for the voice processing system to perform the desired functions. In some cases it may be desirable for the application to access data from a remote system 230, which it would do by exploiting the communications facilities of the operating system (in this case the application may interact directly with the operating system, rather than having to use the DirectTalk software as an intermediary).

Applications for the DirectTalk voice processing system are based on state tables, which essentially list the prompts to be played to a caller and the different actions to be performed dependent on the caller response, plus optional custom servers, which allow more direct program control of the voice processing resources. Thus the development of an application requires the construction of one or more state tables, together with associated prompts and any other more specialised items such as custom servers (for example to provide access to a voice recognition resource). The DirectTalk voice processing system provides a graphical programming tool to facilitate application development. It will be appreciated that the need to develop such programming tools is somewhat burdensome for a voice processing system supplier, since the technology is normally outside the core telephony/IVR expertise of the supplier, and the opportunity to recoup investment in such tools is limited.

As previously mentioned, voice processing applications can become quite complex and also are normally bespoke, in that they are particular to each individual installation. Thus it is difficult for a customer to buy an off-the-shelf solution to satisfy their precise voice processing requirements. Rather, they must first purchase the base voice processing system, and then develop the required application.

In many cases, a customer will contract with some third party to provide a total voice processing solution, including the desired application. This third party is often the manufacturer of the voice processing system, because such manufacturer generally has most expertise in developing applications for their system. This approach can be satisfactory where the voice processing application is essentially a stand-alone operation. However, it is becoming increasingly common to integrate such voice processing applications more and more tightly into the core information systems of a business. For example, it may be desirable to try to match the calling number for all incoming calls against a customer database, to retrieve in real-time information which may be of assistance in processing this call. A customer may be reluctant for a VRU manufacturer to perform such integration for a variety of reasons, perhaps because the manufacturer has insufficient expertise in certain areas of software technology, or perhaps simply because for security reasons it may be undesirable to give a third party too much access to business-critical computer systems.

Furthermore, once a customer has used a third party to develop a voice processing application, they may become dependent on that third party for service and maintenance, which can, in some circumstances, have unfortunate cost implications.

An alternative possibility therefore is for the customer to perform its own voice processing application development in-house, since this gives the customer maximum control over the voice processing application. However, this requires customer software engineers to be skilled in application development on the voice processing system. Such skills are often very rare in the marketplace, given that the absolute number of installations of any one type of voice processing system is rather small, and moreover for this reason, it is rather unattractive for software engineers to focus on such skills, given that they may not significantly enhance their employment prospects. In addition, it is often necessary to have specialised telephony knowledge in order to develop such voice processing applications. Thus it may be difficult for a customer to acquire and retain personnel with the suitable skills required to develop and maintain their own voice processing applications.

SUMMARY OF THE INVENTION

Accordingly, the present invention provides a voice processing system having means for connecting to multiple telephone lines, and comprising a set of line objects, each associated with one of said telephone lines, and each line object including a set of methods which may be invoked by other objects for performing operations on the telephone line associated with that line object.

The line objects therefore effectively provide voice response server functionality, which may be invoked as and when desired by user applications. Thus the user applications are effectively separated by this client server relationship from details of the voice processing system, unlike prior art systems where the application had to run in the voice processing environment for that particular platform. This separation bring significant benefits, in that the application development is no longer tied to the relevant voice processing environment, but rather can utilise generic programming tools and skills. This makes application development much quicker and more cost-effective, since high quality generic programming tools and skills are much more readily available in the marketplace than IVR-specific tools and skills.

In the preferred embodiment the line object methods include Answer Call, End Call, Get DTMF Key(s) and Play Audio, although a wide variety of other methods could be made available. These methods represent the core functionality of a voice processing system (particularly for interactive voice response), and so map easily onto actions already provided in the underlying voice processing system.

The voice processing system preferably further comprises a set of IVR action objects which invoke the methods of a line object, most conveniently with an IVR action object corresponding to each method of a line object. This allows the IVR action objects to be easily incorporated into user applications, from where they can invoke line object methods. This provides a degree of isolation between the business application and the line object, which is desirable given that in the preferred embodiment the latter are created essentially at the request of the former and are tied to a physical telephone line. Thus the use of the IVR action objects as intermediaries helps decouple the business application from details of the physical telephone lines. Note however than in some cases for performance reasons it may be desirable for business applications to directly invoke methods in the line objects, without going via the IVR action objects.

The preferred embodiment also provides some higher level components as IVR action objects, such as for a Voice Menu or a Voice Form, which can be regarded as compound objects formed from the above lower level IVR actions. Such higher level components are found frequently in user applications, and so providing them in ready-made form facilitates rapid application development.

An important aspect of the present invention is that the IVR action objects may execute on a remote system, interacting with the line objects via remote method invocation. Thus the IVR system can be regarded simply as a remote server, which can be called to provide IVR functionality when required. In this approach, it is clear that the overall system is determined by the requirements of the business application, and these can then be fed down into the IVR components of the application. This is to be contrasted with prior art systems, in which the voice processing application ran essentially as a stand-alone application in conjunction with (on top of) the voice processing environment, and was thus very constrained by the limitations of the voice processing system; it was also difficult to integrate such a standalone voice processing application into the wider corporate computing environment.

The invention further provides a business application system including voice processing functionality for a set of multiple telephone lines, comprising:

business application programming objects;

voice processing component objects integrated with said business application programming objects, to be called when said business application requires voice processing functionality; and a voice processing server including programming object means responsive to said voice processing component objects to provide the required voice processing functionality.

In the preferred embodiment said programming object means comprise line objects, each line object being associated with one of said telephone lines.

The invention further provides a method of operating a business application including voice processing functionality for a set of multiple telephone lines, comprising the steps of:

providing business application programming objects, said business application programming objects including voice processing component objects;

calling said voice processing component objects when said business application programming objects require voice processing functionality;

providing software server means including voice processing software which interacts with voice processing hardware to perform voice processing functions, wherein said business application objects including said voice processing component objects are independent of said voice processing software, and interact with said voice processing software only via said software server means;

and invoking a method in said software server means by said voice processing component objects, responsive to a call from said business application programming objects for voice processing functionality, wherein said method in the software server means interacts with the voice processing software and voice processing hardware to perform the requested voice processing function.

In the preferred embodiment, said business application programming objects including said voice processing component objects are located on a first system, and said software server means is located on a second system which includes said voice processing software and voice processing hardware, whereby said voice processing component objects and said software server means communicate via remote method invocation. Thus we can see that the logical decoupling of the application from the IVR system has the added advantage that it is now possible to separate these onto different machines, in particular it is no longer necessary for the application to run on the voice processing system itself. This greatly adds to the flexibility and potential efficiency of the overall architecture, and opens the possibility of one business application being able to utilise multiple voice processing server systems.

BRIEF DESCRIPTION OF THE DRAWINGS

A preferred embodiment of the invention will now be described in more detail by way of example only with reference to the following drawings.

DETAILED DESCRIPTION

Figure 2:
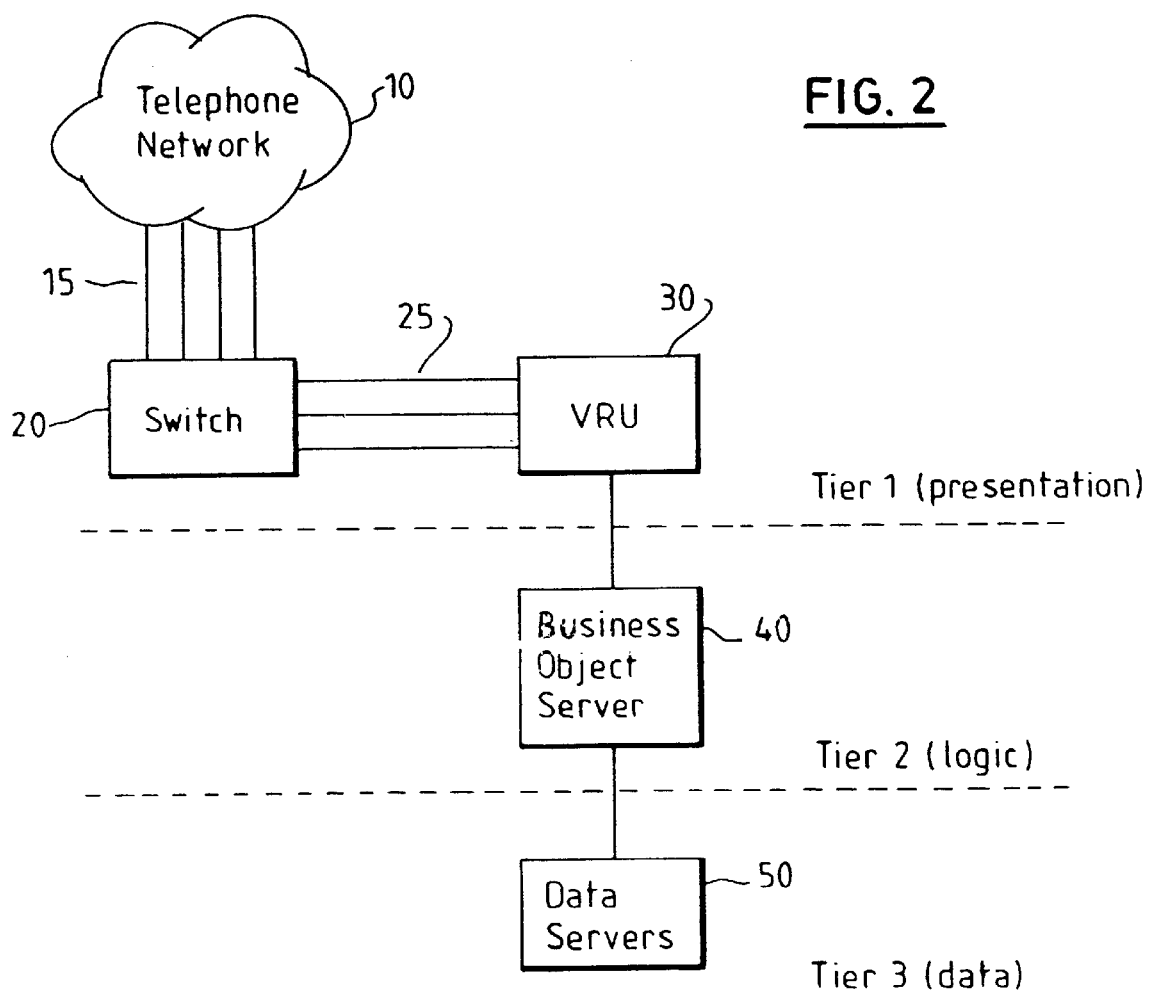
FIG. 2 shows the structure of a business application which includes voice processing functionality in accordance with the present invention.

FIG. 2 shows a customer solution for a voice processing application. In particular, the customer premises include a switch 20 attached to the public telephone network 10 by one or more trunk lines 15 (typically T1 lines, each comprising 24 conventional telephone connections), and a VRU 30 attached to the switch again by one or more trunk lines. The VRU hardware is based upon a conventional computer workstation including a line interface card or cards (not shown) to terminate respective incoming trunk lines 25, and a time division multiplex (TDM) bus or other appropriate connector to distribute telephony channels from the line card(s) to appropriate voice processing resources within the VRU. At this hardware level, the VRU conforms to known voice processing systems.

The system of FIG. 2 has been set into the so-called "3-tier" model of a corporate computing infrastructure. In this model, Tier 3 conceptually represents the corporate stored data sets which are utilised and processed to support corporate computer applications. Thus these data sets represent corporate customer lists, product information, and so on, which are fundamental to the operation of a business, and are generally stored in large database systems on dedicated data servers.

The next layer in the 3-tier model is Tier 2, which represents a business application or logic that exploits and/or processes the Tier 3 data. Thus for example an order processing application may take information from both a customer data set and a product information data set to allow an order to be placed and subsequently tracked. The final layer in the 3-tier model is Tier 1, which is the presentation layer. This is the software that represents the front end of the application or business logic (there may be multiple front ends for any given application). This front end may be exposed directly to an actual consumer, perhaps to allow an order to be placed for a product over the Internet, or alternatively to some internal agent, for example a sales representative who is accepting a product order within a department store.

Figure 1:
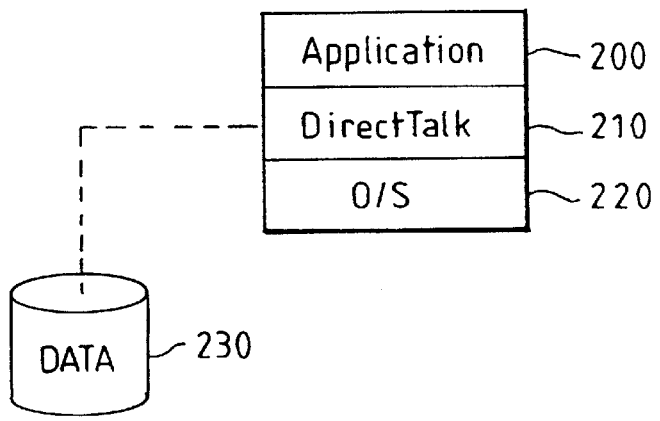
FIG. 1 shows the conventional structure of a voice processing application.

It has been difficult in the past to map the conventional voice processing application structure of FIG. 1 onto the 3-tier model. Thus although such applications commonly accessed remote data servers, which would represent Tier 3, the there was no clear distinction between Tiers 1 and 2 in most voice processing systems. In other words, conventional voice processing systems combine the logic and presentation layers together into a single application structure. This is one reason for the difficulty discussed in the introduction of integrating voice processing systems into the wider corporate computer infrastructure.

However, this problem may be overcome by the radical restructuring of the voice processing system as indicated in FIG. 2. In particular, a clear logical demarcation is now introduced between the application, represented in FIG. 2 as a set of business object servers 40, and the voice response unit 30 itself. Thus in the context of the present invention, the voice response unit is firmly placed within Tier 1 as another presentation mechanism, whilst the application or business logic of Tier 2 is effectively detached from the voice processing system.

Figure 3:
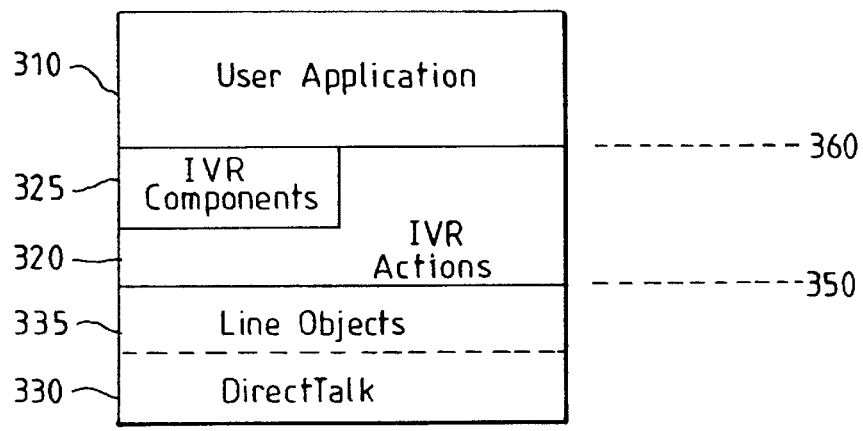
FIG. 3 shows in more detail the software structure in the business application with voice processing functionality of FIG. 2.

The programming structure to support the model of FIG. 2 is illustrated in FIG. 3, and is somewhat more complex than that of FIG. 1. It is important to appreciate that this structure is based on an object oriented approach, and so revolves as much as possible around sets of interacting objects. Thus a base layer of DirectTalk voice processing software 330 remains to directly control the various hardware elements of the voice processing system, and to perform the basic telephony and data transport functions. Above this layer sits a set of line objects 335. These represent the fundamental resource provided by the voice processing system, in that any operations or actions are performed on one or more line objects. Above the line objects sit a set of interactive voice response (IVR) actions 320, such as Answer Call, Play Prompt, and so on. The user application 310 then sits on top of these and effectively integrates selected IVR actions, so that the business application can invoke the IVR action objects as necessary in conjunction with a corresponding line object to produce a desired action for that line object.

Also shown in FIG. 3 are a set of IVR components 325. These effectively represent commonly used components of IVR applications, but which conceptually are at a somewhat higher level than the basic IVR actions. In the present embodiment two IVR components are provided, a voice menu and a voice form. These can be regarded as compound objects to the extent that they can be constructed out of the simpler IVR actions 320. Thus a voice menu essentially comprises playing a set of voice prompts, followed by receipt of user input, typically a DTMF key, along with appropriate error handling and so on. A voice form on the other hand essentially comprises a set of voice prompts, interleaved by receipt of caller input, either in the form of DTMF keys, or as recorded speech. (It should be noted however that for performance reasons, these compound objects may not necessarily be constructed simply out of the IVR actions, but rather may be fully coded to interact directly with the line objects).

There are two important interfaces marked in FIG. 3, shown as interface 360 and interface 350. It should be appreciated that these are not programming interfaces in the conventional sense, but rather represent notional boundaries between different logical groupings of objects; objects in different groups can communicate with one another across these boundaries.

The first interface 360 corresponds effectively to the boundary between the generic IVR software, supplied by the manufacturer of the voice processing system, and the particular application developed by or for the user. Thus interface 360 corresponds approximately to the boundary in FIG. 1 between the application 200 and the DirectTalk software 210. Note however, that the provision of a set of IVR components 325, which were not generally available per se in the prior art, increases the power and utility of this interface, and facilitates rapid application development at the user level. It is also important to remember that as a result of the object oriented structure of this solution, a business application comprises both user-developed business objects, plus the desired IVR action objects, so that in a final user solution these two sets of objects are effectively integrated with one another, rather than being shown separate as in FIG. 3.

The second interface shown in FIG. 3, interface 350, is important because it represents the boundary between IVR specific software (the line objects), and what is an essentially independent business application which incorporates IVR action objects. Thus in a significant departure from prior art systems, the set of IVR actions are not directly coupled into the basic voice processing software (ie the DirectTalk software 330). Instead, the IVR actions represent essentially independent objects which interact with the voice processing system via the predefined interface into the set of line objects. In other words, the line objects represent IVR server functionality which can be invoked by IVR client applications via appropriate method invocations. Following on from this, it can be seen therefore that interface 350 corresponds effectively to the boundary between Tier 1 and Tier 2 shown in FIG. 2.

We can now consider the structure and behaviour of a line object in more detail. Thus a line object is created in response to the application requesting a line from a line resource object (not shown in FIG. 3). The line resource object, which can be particular to a single IVR, or in the preferred embodiment can control the resources of multiple IVRs, is supplied with configuration information representing the line (channel) capacity of the IVR(s). It can then determine the amount of capacity that has hitherto been allocated (or possibly returned and made available for reallocation). Assuming that some spare capacity is indeed available, the line resource creates a line object, which is tied to a physical channel on the IVR. The business application is then passed a connection identifier, which allows it to interact with the allocated line object.

A line object is defined principally by the set of methods which can be invoked by other objects. These are listed in Table 1.

TABLE 1

METHODS FOR LINE OBJECT

Answer Call
End Call
Make Call
Notify Ringing
Get DTMF Tone(s)
Play Audio
Record Audio It will be appreciated that this list is just a representative sample of possible line object methods; not all the above methods need to be supported, whilst other methods may be included. For example, in one current implementation, Record Audio is not supported, nor is Notify Ringing (which is effectively assumed to occur automatically at line object creation); however, this implementation has multiple Get DTMF Tone(s) methods, dependent on whether the action is to be terminated by a time-out, receipt of a predetermined number of DTMF tones, or receipt of a predetermined DTMF character. Thus the skilled person will be aware of many variations and additions that might be made to the above list of line object methods.

The present embodiment is written in the Java programming language (Java is a trademark of Sun Microsystems Inc) and the above methods of a line object are primarily implemented as native methods on the IVR (in the context of DirectTalk, this is achieved via suitable state tables and custom servers). In other words when a particular line object action is invoked, such as Answer Call, then the corresponding method makes a corresponding call into the DirectTalk voice processing system. It will be appreciated that the set functions corresponding to the above set of line object methods are readily available on conventional voice processing systems.

An important aspect of a line object is that when it is created and attached to a physical line on a particular system, the properties of that particular system are imported. Thus the implementation of the line-object methods is platform-specific, but the set of methods provided is not. As a consequence of this, the system of FIG. 2 is not tied to any one IVR platform, in that the same application can run on any platform, providing the line resource is able to create an appropriate line object for that platform. This is clearly of significant benefit in terms of portability and scalability.

If we now consider the IVR action objects 350, these in fact correspond very closely with the set of methods available on a line object, in that there is one IVR action object for each method in the line object. These i IVR action objects are therefore trivial to the extent that their primary action is to invoke the corresponding method in the specified line object. The purpose of this layer of IVR actions is to insulate the business application from the line objects, since the latter are created in relation to particular physical lines, whereas the business application is concerned with the connection identifiers supplied by the line resource object. This avoids tying the business application too closely to any particular physical IVR system or telephone line. Note however it may be preferable in some situations for performance reasons for the business applications to by-pass the IVR action objects, and interact instead directly with the line objects by invoking the desired method in the line object.

The IVR action objects are again implemented as a set of Java objects, more particularly, they are implemented as a set of "Java Beans" (a Java Bean is essentially a Java object which has certain features that allow it to be more easily integrated as a component in other applications; further information about Java Beans can be accessed via http://www.javasoft.com/beans/). (Java Beans is a trademark of Sun Microsystems Inc.)

As previously noted, FIG. 2 also illustrates higher level objects, designated as IVR components 325. In the preferred embodiment there are two such IVR component objects, the first for a voice menu, the second for a voice form, and these are again provided as Java Beans. These higher level objects are available for integration into user application, and represent common components of IVR applications. Finally, considering now the business application 310, this is again generally written in Java, for ease of integration with the IVR action objects provided as a set of Java Beans.

The architecture of FIG. 2 provides many benefits over the conventional approach to IVR applications. Firstly, the use of interacting objects allows a client server approach, which in turn allows the business application to be separated from the IVR platform. Thus as previously discussed, and as illustrated in FIG. 1, conventional IVR applications execute within a specialised IVR environment, making program development and maintenance more difficult, and also hindering a closer integration with other corporate computing systems. By contrast, in the present invention, only the line objects execute within the specialised IVR environment, with these line objects effectively providing an IVR server functionality. This then allows the logic of the IVR application to be integrated (as the set of IVR action objects) into the business application, with a client server relationship with the line objects being used to access any desired IVR functionality. Thus the IVR application is effectively subsumed as a mere component of the business application. This therefore allows very close integration between the business application and the IVR application, and moreover allows the requirements of the former to determine the latter, rather than vice versa as has occurred in the prior art. Conceptually, this can be considered as a shift from an "IVR-centric" paradigm to an "application-centric" paradigm).

Another significant benefit of the present invention is that since the IVR application is no longer being programmed within the voice processing environment, but rather is integrated into the general business application, then there is no need for the voice processing system to provide application development tools. Rather industry standard software development tools (both for graphical programming and for scripting) can be used to develop the overall business application, including the integrated IVR application which can be formed by assembly of the appropriate Java Beans (an example of such an application development tool is VisualAge for Java available from IBM Corporation; "VisualAge" is a trademark of IBM Corporation). A consequence of this is that the development of IVR applications no longer requires specialised knowledge of IVR systems, since this is effectively all hidden within the line objects, but rather can be performed by a much wider range of programmers. This use of industry-standard tools and technology allows voice processing applications to be developed much more quickly, and without any risk of a customer becoming locked into a particular specialised IVR environment.

A further benefit is that the use of Java objects in conjunction with remote method invocation (RMI) provides great flexibility in the design of applications. (RMI allows an object on one machine to remotely invoke a method of an object on a remote machine; more details on RMI can be obtained via http://www.javasoft.com/marketing/collateral/rmi_ds.html) . A variety of possible scenarios are illustrated in FIGS. 4A–C, which show RMI occurring between an IVR 410 including the DirectTalk voice processing software 415 and a remote Java system 400, which generally will not have any telephony or IVR capabilities, and can be any conventional workstation.

Figure 4A:
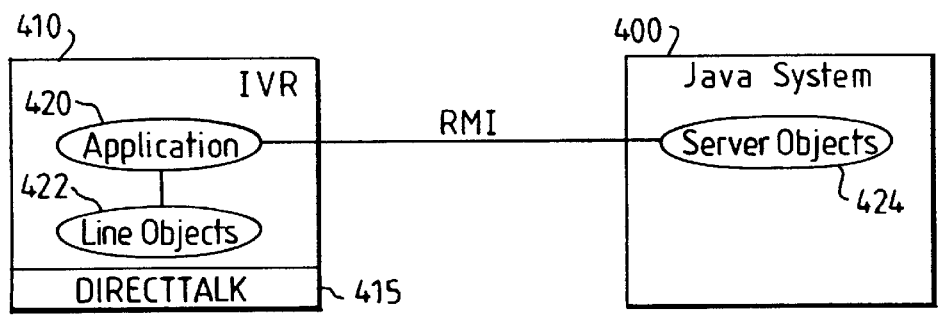
FIGS. 4A–C show a variety of ways in which a business application can be distributed across an IVR and a standard computer workstation using remote method invocation.
Figure 4B:
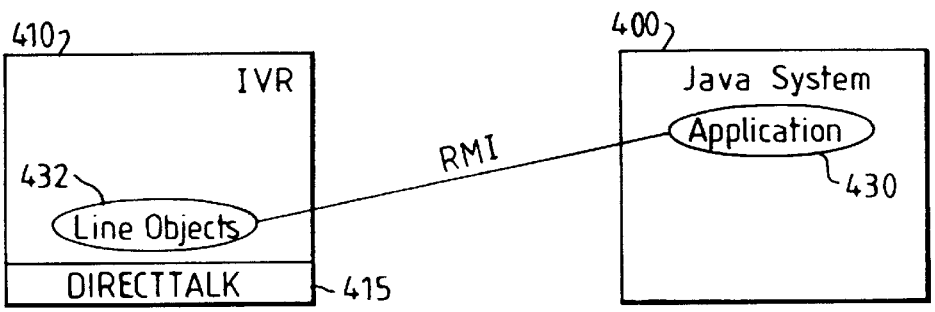

Thus in FIG. 4A the application 420 runs on the IVR itself, and interacts in straightforward fashion with the line objects 422 on the IVR. However, the application may use RMI to invoke server objects 424 on the remote Java system. Note that this approach has some similarities to the conventional set-up as illustrated in FIG. 1. A very different arrangement is depicted in FIG. 4B, where the application 430 itself now resides on the remote Java workstation. In this situation, the application uses RMI to obtain access to the line objects 432 on the IVR system, which thus act as a remote IVR server resource. This approach has many advantages, for example the application can now run on a dedicated machine suited to its particular performance requirements, rather than having to share the IVR system with the voice processing software (nb IVR systems are often only available on a limited range of base computer systems, in view of the need to incorporate specialised telephony hardware). Moreover, it is also straightforward to have a single application on one Java workstation in command of multiple IVR systems.

Figure 4C:
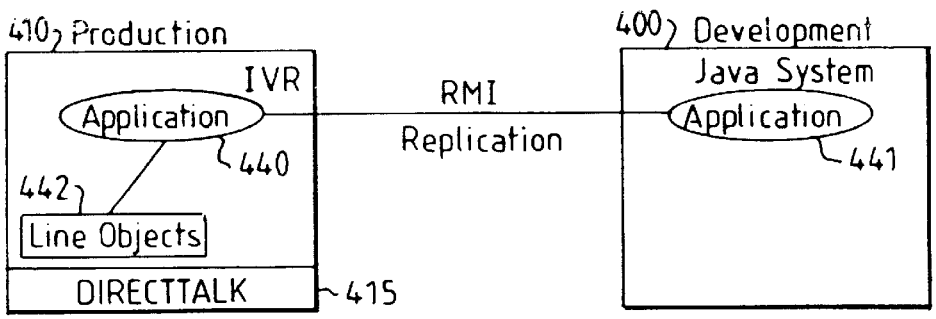

Finally, FIG. 4C shows a somewhat different arrangement, in which there is a production IVR system including user application 440 and line objects 442, as, for FIG. 4A. This time RMI is used to replicate the application onto the Java workstation. The developer can then this form of remote access to work on replicated application 441 on his own local system, using whatever programming tools are available for the Java workstation (rather than having to rely on those that are available for the IVR system). Note that as an alternative to FIG. 4C, it would be possible to install line object simulators on the Java workstation, to again facilitate application development on this platform.

It will be appreciated that although the preferred embodiment has been described in terms of the Java programming language, any other suitable language (or combination of languages) could be used, providing that the requisite functionality as described herein was available. Further, although the interaction of objects on different machines has been described in terms of RMI, it will be recognised that other mechanisms such as CORBA could be used instead.

What is claimed is:

1. A voice processing system having:

means for interfacing to one or more telephony trunk connections supporting multiple physical telephony channels, each providing a telephone line, a set of line objects, each tied to one of said physical telephony channels and including a set of methods which may be invoked by other objects for performing operations on the physical telephony channel to which that line object is tied, and a line resource object supplied with configuration data representing a channel capacity of the voice processing system and including means for allocating and deallocating physical telephony channels, said line resource object being responsive to a request for a telephone line from an application to create a new line object, providing this does not exceed the channel capacity of the voice processing system.

2. The voice processing system of claim 1, wherein said methods include Answer Call and End Call.

3. The voice processing system of claim 1, wherein said methods include Get DTMF Key(s) and Play Audio.

4. The voice processing system of claim 1, further comprising a set of IVR action objects which invoke the methods of a line object.

5. The voice processing system of claim 4, wherein there is an IVR action object corresponding to each method of a line object.

6. The voice processing system of claim 4, wherein the IVR action objects include a voice menu action object.

7. The voice processing system of claim 4, wherein the IVR action objects are Java Beans.

8. The voice processing system of claim 4, wherein the IVR action objects may execute on a remote system from the line objects, and interact with the line objects via remote method invocation.

9. The voice processing system of claim 7, wherein the IVR action objects may execute on a remote system, and interact with the line objects via remote method invocation.

10. A method of operating a business application including voice processing functionality for a set of multiple telephone lines, comprising the steps of:

providing business application programming objects, said business application programming objects including voice processing component objects;

calling said voice processing component objects when said business application programming objects require voice processing functionality;

providing software server means including voice processing software which interacts with voice processing hardware to perform voice processing functions, wherein said business application objects including said voice processing component objects are independent of said voice processing software in that they do not interact with said voice processing software except via said software server means;

and invoking a method in said software server means by said voice processing component objects, responsive to a call from said business application programming objects for voice processing functionality, wherein said method in the software server means interacts with the voice processing software and voice processing hardware to perform the requested voice processing function.

11. The method of claim 10, wherein said software server means includes a plurality of line objects, each line object being associated with one of said telephone lines, and wherein said voice processing component objects invoke methods in said line objects.

12. The method of claim 10, wherein said business application programming objects including said voice processing component objects are located on a first machine, and said software server means is located on a second machine which includes said voice processing software and voice processing hardware.

13. The method of claim 12, wherein said voice processing component objects and said software server means communicate via remote method invocation.

14. The method of claim 11, wherein said business application programming objects including said voice processing component objects are located on a first machine and said software server means is located on a second machine which includes said voice processing software and voice processing hardware.

15. The method of claim 14, wherein said voice processing component objects and said software server means communicate via remote method invocation.

* * * * *